United States Patent [19]
Knotts

[11] Patent Number: 5,671,391
[45] Date of Patent: Sep. 23, 1997

[54] COHERENT COPYBACK PROTOCOL FOR MULTI-LEVEL CACHE MEMORY SYSTEMS

[75] Inventor: Brian W. Knotts, West Columbia, S.C.

[73] Assignee: NCR Corporation, Dayton, Ohio

[21] Appl. No.: 710,052

[22] Filed: Sep. 10, 1996

Related U.S. Application Data

[63] Continuation of Ser. No. 179,454, Jan. 10, 1994, abandoned.

[51] Int. Cl.[6] .................................................. G06F 12/12
[52] U.S. Cl. ................................................ 395/470; 395/473
[58] Field of Search ........................... 395/470, 473, 395/481, 486

[56] References Cited

U.S. PATENT DOCUMENTS

| | | | |
|---|---|---|---|
| 4,445,174 | 4/1984 | Fletcher | 395/448 |
| 4,928,225 | 5/1990 | McCarthy et al. | 395/472 |
| 4,977,498 | 12/1990 | Rastegar et al. | 395/455 |
| 5,008,813 | 4/1991 | Crane et al. | 395/446 |
| 5,029,070 | 7/1991 | McCarthy et al. | 395/470 |
| 5,056,002 | 10/1991 | Watanabe | 395/446 |
| 5,058,006 | 10/1991 | Durdan et al. | 395/449 |
| 5,060,144 | 10/1991 | Sipple et al. | 395/726 |
| 5,214,765 | 5/1993 | Jensen | 395/449 |
| 5,285,323 | 2/1994 | Hetherington | 395/449 |
| 5,287,484 | 2/1994 | Nishii et al. | 395/471 |
| 5,297,269 | 3/1994 | Donaldson et al. | 395/472 |
| 5,317,716 | 5/1994 | Liu | 395/471 |
| 5,355,467 | 10/1994 | MacWilliams et al. | 395/473 |

OTHER PUBLICATIONS

"82495DX/82490DX Architectural Overview", Intel, Date Unknown, pp. 18–22.

*Primary Examiner*—Tod R. Swann
*Assistant Examiner*—Christopher S. Chow
*Attorney, Agent, or Firm*—Paul W. Martin

[57] ABSTRACT

A coherent copyback protocol for a multi-level cache memory system prevents more than one modification from existing in multiple locations and saves access time and data bandwidth. The protocol includes the Latest state. A line in the Latest state has the latest copy of modified data. Additionally, all corresponding lines in any higher cache(s) are marked as invalid and all corresponding lines in any lower level cache(s) are marked as modified.

2 Claims, 2 Drawing Sheets

COHERENT COPYBACK PROTOCOL FOR MULTI-LEVEL CACHE MEMORY SYSTEMS

This is a continuation of application Ser. No. 08/179,454, filed on Jan. 10, 1994, now abandoned.

BACKGROUND OF THE INVENTION

The present invention relates to cache memory systems, and more particularly to a coherent copyback protocol for multi-level cache memory systems.

Cache memories were added to computer systems in the late 1960's in order to reduce the amount of time that the system's processor spent waiting for data to be transferred for processing and thereby reduce overall processing time. At that time, the typical computer system had only one processor which was often referred to as the central processing unit. Since these systems only had one processor, mixing cache types among multiple processors was not a problem.

As both the need and demand for data processing power became greater, more central processing units were added, resulting in multiple processor computer systems. These additional central processors have cache memories to enhance performance. The presence of multiple processors and multiple caches created the possibility of having the same data processed in two different ways. Having two different results at the same memory address in cache memories of two different processors is unacceptable. This problem is known as the cache memory data coherency problem.

The known solution to the data coherency problem is the Modified-Exclusive-Shared-Invalid (MESI) cache coherency protocol, which is hereby incorporated by reference. The MESI protocol allows each line of data in a cache to have an associated field which indicates whether the line of data is MODIFIED, EXCLUSIVE, SHARED, or INVALID. Each state is defined below for any cache:

MODIFIED—This state indicates a line of data which is exclusively available in only this cache, and is modified (main memory's copy is state or the most recent copy). Modified data has been acted upon by a processor. A Modified line can be updated locally in the cache without acquiring the shared memory bus.

EXCLUSIVE—This state indicates a line of data which is exclusively available in only this cache, and that this line is not Modified (main memory also has a valid copy). Exclusive data can not be used by any other processor until it is acted upon in some manner. Writing to an Exclusive line causes it to change to the Modified state and can be done without informing other caches, so no memory bus activity is generated. The Exclusive state is of limited use in a copyback cache that allocates on "writes". The Exclusive state is generally bypassed because the entry goes directly to the Modified state.

SHARED—This state indicates a line of data which is potentially shared with other caches (the same line may exist in one or more caches). Shared data may be shared among multiple processors and stored in multiple caches. A Shared line can be read by the CPU without a main memory access. Writing to a Shared line causes a write-through cycle.

INVALID—This state indicates a line of data is not available in the cache. Invalid data in a particular cache is not to be used for future processing, except diagnostic or similar uses. A read to this line will be a "miss" (not available). A write to this line will cause a write-through cycle to the memory bus.

With the MESI protocol, it is possible for multiple level copyback cache memories to have modified data lines stored at different hierarchical memory levels and yet have none of the modified data be consistent with main memory or with each other. The modified data residing at the highest hierarchical level, i.e. the cache memory closest to its respective processor, of a copyback cache system is always the most recent copy of the data. Thus in a multiple level cache, it is difficult to distinguish between modified data that is not the latest modification and modified data that is the latest modification thereof. System data bandwidth could be saved if the cache coherency protocol used could readily distinguish between encached data that is the latest modification thereof and other modifications thereof.

Thus, it would be desirable to provide a coherency protocol for multiple level caches in multiple processor computer systems that would quickly distinguish between the most recent data and stale copies of data to save access time and data bandwidth.

SUMMARY OF THE INVENTION

In accordance with the teachings of the present invention a coherent copyback protocol for multi-level cache memory systems is provided. The coherency protocol includes a plurality of possible states for each line of data stored in any one of the cache memories. The states include:

1. a Modified state in which a line in any one of the cache memories is exclusively available in only the one cache memory and has been modified;
2. a Shared state in which a line may exist in more than one of the cache memories at the same time and is consistent with main memory;
3. an Invalid state in which a line in any one of the cache memories is unavailable; and
4. a Latest state in which a line in one of the cache memories, which is not the highest level cache memory, stores the most recent copy of modified data and in which the same lines in the higher-level cache memories are in the Invalid state and the same lines in lower-level cache memories are in the Modified state.

Advantageously, the coherent copyback protocol of the present invention prevents more than one modification from existing in multiple locations and saves access time and data bandwidth.

It is a feature of Applicant's Latest-Modified-Shared-Invalid (LMSI) protocol that a new state, the Latest state, is defined.

It is accordingly an object of the present invention to provide a coherent copyback protocol for multi-level cache memory systems.

It is another object of the present invention to provide a new coherency protocol for multi-level caches in a multiple processor computer system.

It is another object of the present invention to provide a coherency protocol for multi-level caches that includes a procedure for quickly distinguishing between the most recent data and stale copies of data.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
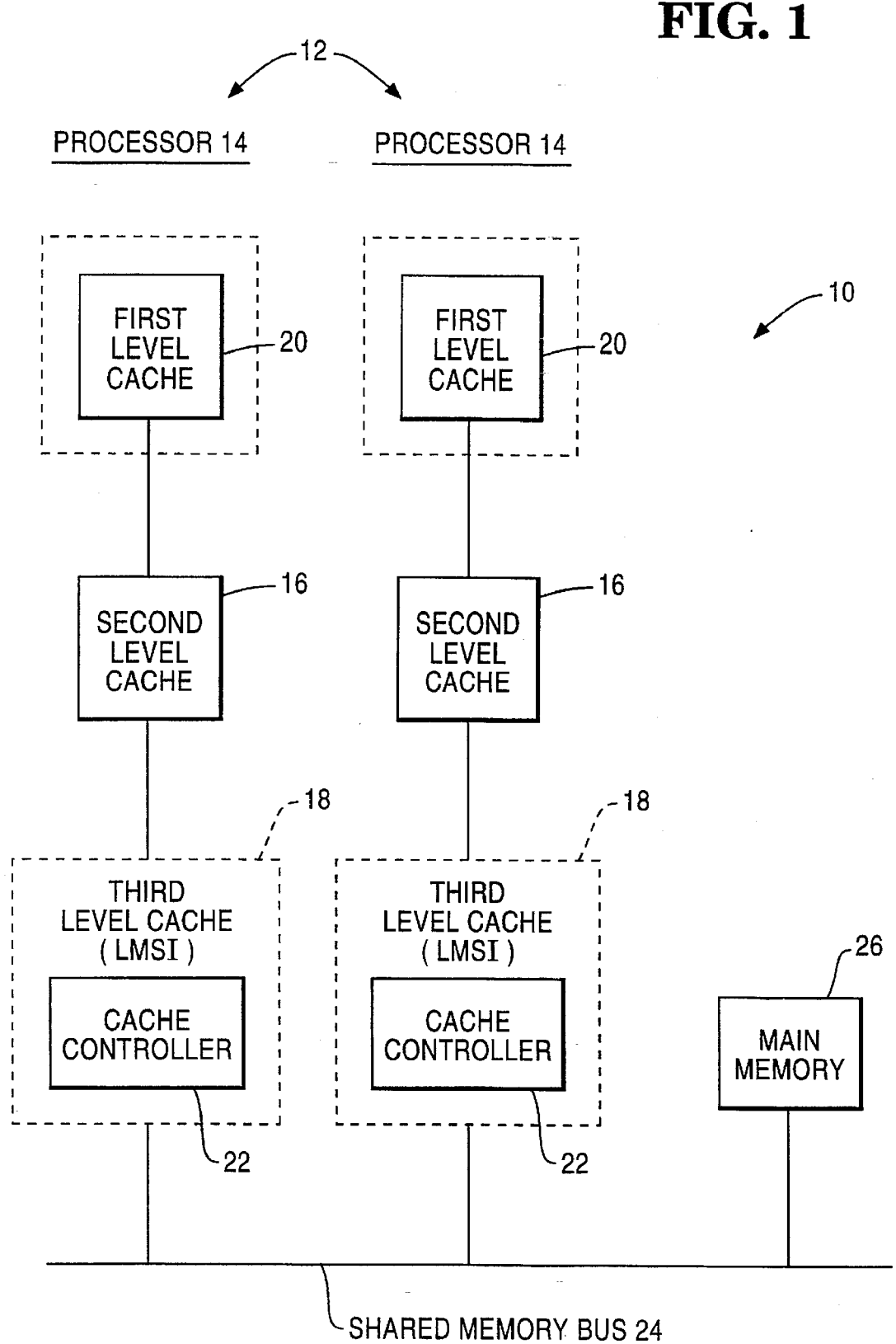
FIG. 1 is a block diagram illustrating a multi-processor computer system having multiple levels of cache memories.

Referring now to FIG. 1, computer system 10 includes a plurality of processing units 12 coupled to a shared memory bus 24. The present invention envisions any number of processing units 12. Each processing unit 12 includes a processor 14, a secondary cache memory 16, and a tertiary cache memory 18.

Processors 14 include onboard primary cache memories 20.

Secondary cache memories 16 are typically located on the mother board.

Tertiary cache memories 18 are also typically located on the mother board. Each tertiary cache memory 18 has an associated controller 22, which contains a state machine that implements the cache coherency protocol of the present invention.

Primary, secondary, and tertiary cache memories 20, 16, and 18 all follow the "inclusion" principle, which states that any higher cache level entry is a subset of the lower level caches, where the primary cache is the highest level cache.

Main memory 26 is used by processors 14 to execute code and store data and may be thought of as a fourth level cache memory.

Figure 2:
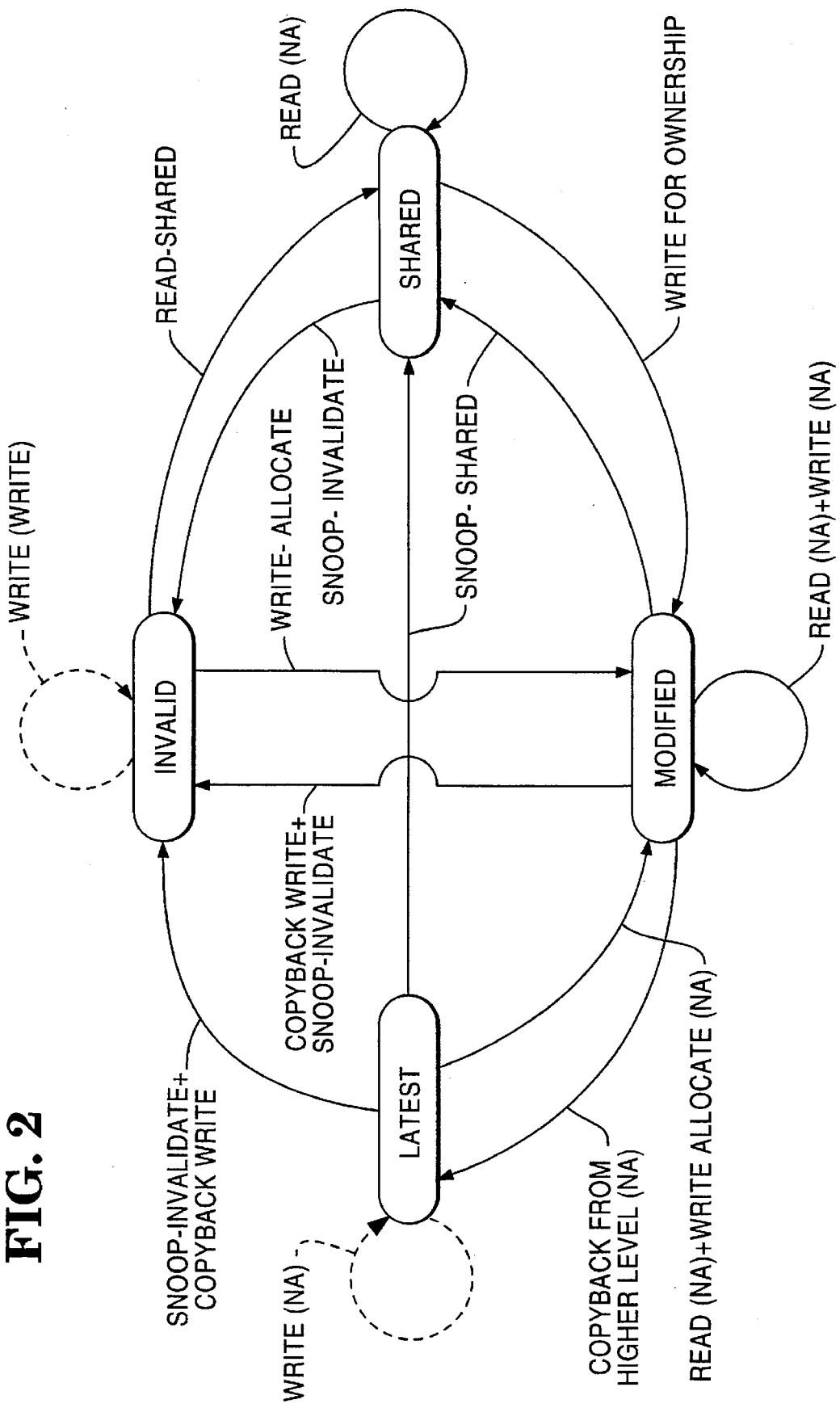
FIG. 2 is a state diagram of a cache coherency protocol according to the present invention.

Turning now to FIG. 2, the LMSI protocol of the present invention is explained in more detail. Applicant's LMSI protocol includes a new state, the Latest state, which replaces the Exclusive state of the MESI protocol:

LATEST—This state indicates a line which ensures that memory with a line marked as latest has the most recent copy of Modified data and that higher-level cache memories have the line marked Invalid. The same lines in lower-level cache memories are in the Modified state.

With reference to system 10, the Latest state represents that tertiary cache memory 18 has the latest copy of Modified data and that primary and secondary cache memories 20 and 16 have the line marked Invalid. Thus, the only way to get to the Latest state is to copyback data that was modified at a higher level to a lower level LMSI protocol cache. The LMSI cache should not be the highest cache or the Latest state will never be entered.

Each of the four states is represented in the state diagram of FIG. 2 within a pill-shaped box. The Modified, Shared, and Invalid states are similar to their counterparts under the MESI protocol.

State transitions under the LMSI protocol are shown in the table below. State transitions represent requests from higher-level caches or lower level caches. A lower level cache may be main memory 26. The state transitions represented by dashed lines are state transitions for a cache that doesn't allocate on writes. Comments inside the parentheses ( ) indicate the type of cycle occurring on the lower level bus. "N/A" stands for "no activity".

The "current state" refers to the state of the cache line being accessed by one of processors 14 or a "snoop" from another cache on shared memory bus 24. "Snoop" refers to an "inquire" of a cache memory to determine whether it contains the cache line. Possible data sourcing by the snooped cache may follow. The "action" refers either to read or write by one of processors 14, or a "snoop" initiated by another cache. The "new state" refers to the state of the current cache line after the "action" is performed. "Shared memory bus activity" refers to the action that takes place on shared memory bus 24 (if any) as a result of the "action" being performed on the cache line.

| CURRENT STATE | ACTION | NEW STATE | SHARED MEMORY BUS ACTIVITY |
| --- | --- | --- | --- |
| M | READ | M | NONE |
|   | WRITE | M | NONE |
|   | SNOOP-SHARED | S | WRITE BACK |
|   | COPYBACK | L | NONE |
|   | COPYBACK + SNOOP INV | I | WRITE |
| L | READ + WRITE ALLOCATE | M | NONE |
|   | SNOOP SHARED | S | NONE |
|   | SNOOP INV + COPYBACK | I | WRITE |
| S | READ | S | NONE |
|   | WRITE | M | WRITE THROUGH |
|   | SNOOP INV | I | NONE |
| I | READ | S | LINE FILL |
|   | WRITE | M | LINE FILL |

While in the Modified state, a Modified line can be updated locally in the cache without acquiring shared memory bus 24. This is reflected in the Read and Write actions of the table above and the circle of FIG. 2 that begins and ends in the modified state. A snoop results in a transition to the Shared or Invalid state based upon the type of coherency inquire. The snoop action may require a write back to the shared memory bus 24. A copyback from a Modified line results in a transition to the Invalid state and requires data to be transferred on the shared memory bus. A copyback from a higher-level cache results in a transition to the Latest state without acquiring shared memory bus 24. The only way to get to the Latest state is to have data modified at a higher-level cache and copied back to a lower level cache.

While in the Latest state, a snoop may result in a transition to the Shared or Invalid state based on the type of coherency inquire. A read or write allocate from the Latest state results in a transition to the Modified state without acquiring shared memory bus 24. The Latest state is the only state wherein the snoop or copyback need not propagate up to a higher-level cache. In the Latest state, the cache is the highest level cache that has a copy of the data.

While in the Shared state, a Read action can be read locally in the cache without acquiring shared memory bus 24. This is reflected in the Read action of the table above and the circle of FIG. 2 that begins and ends in the Shared state. A Write action results in a transition of the Modified state with a write for ownership on shared memory bus 24. A snoop invalidate results in a transition to the Invalid state.

While in the Invalid state, a Read action results in a transition to the Shared state and a line fill. A write cycle in a write allocate cache results in a transition to the Modified state and a read for ownership on shared memory bus 24.

Advantageously, the Latest state significantly reduces the number of snoops. Much less system bandwidth is required to maintain cache coherency in a multi-level copyback cache system. Performance simulations have shown that some systems 10 may be in the Latest state as much as seventy-five percent of the time.

Although the present invention has been described with particular reference to certain preferred embodiments thereof, variations and modifications of the present invention can be effected within the spirit and scope of the following claims.

What is claimed is:

1. A computer system having a plurality of cache memories organized in a hierarchy comprising:

a processor;

a first level cache memory within the processor, wherein the first level cache memory is a highest level cache memory;

a second level cache memory coupled to the first level cache memory, wherein the second level cache memory is a second-highest level cache memory;

a third level cache memory coupled to the second level cache memory, wherein the third level cache memory is a third-highest level cache memory;

a main memory which acts as a fourth level cache memory, wherein the main memory is a fourth-highest level cache memory; and a shared memory bus coupling the third level cache memory to the fourth level cache memory;

wherein any one cache memory of the first, second, third, or fourth level cache memories may include a line of data in any one of a plurality of states including:

a Modified state in which the line of data is exclusively available in only the one cache memory and has been modified;

a Shared state in which the line of data may exist in the one cache memory and any other cache memory at a same time; and an Invalid state in which the line of data is unavailable; and wherein any one cache memory of the second, third, or fourth level cache memories may include a line of data in a Latest state in which the line of data is a most recent copy of Modified data, and in which the line of data in all higher-level cache memories is in the Invalid state and the line of data in all lower-level cache memories is in the Modified state.

2. A coherency protocol for multiple cache computer systems that has a state diagram as shown in FIG. 2.

* * * * *